Aug. 30, 1966  W. C. LATHERS  3,269,285
EARTH COMPACTING DEVICE
Filed Feb. 12, 1964  2 Sheets-Sheet 1
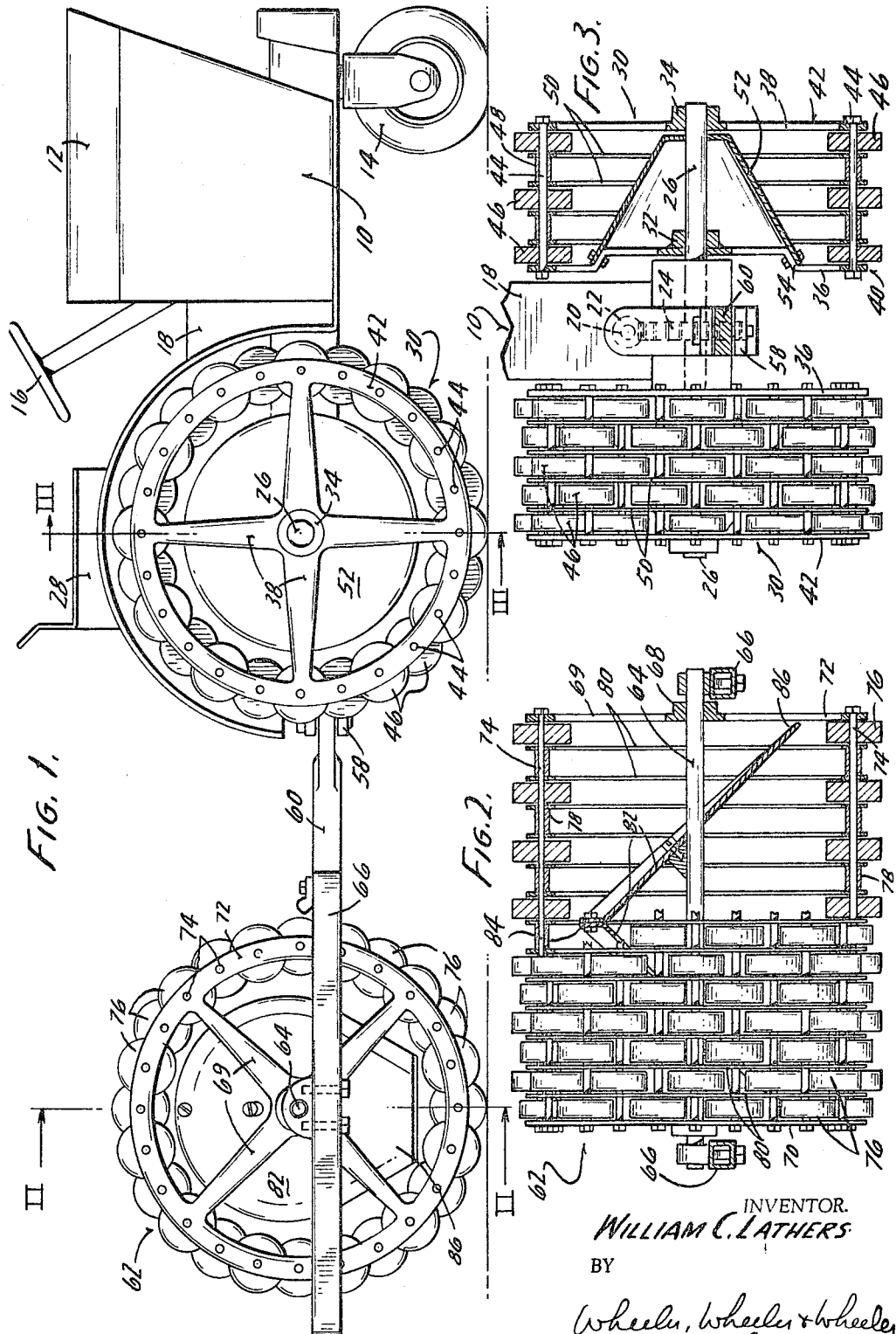
INVENTOR.
WILLIAM C. LATHERS
BY
Wheeler, Wheeler & Wheeler
ATTORNEYS

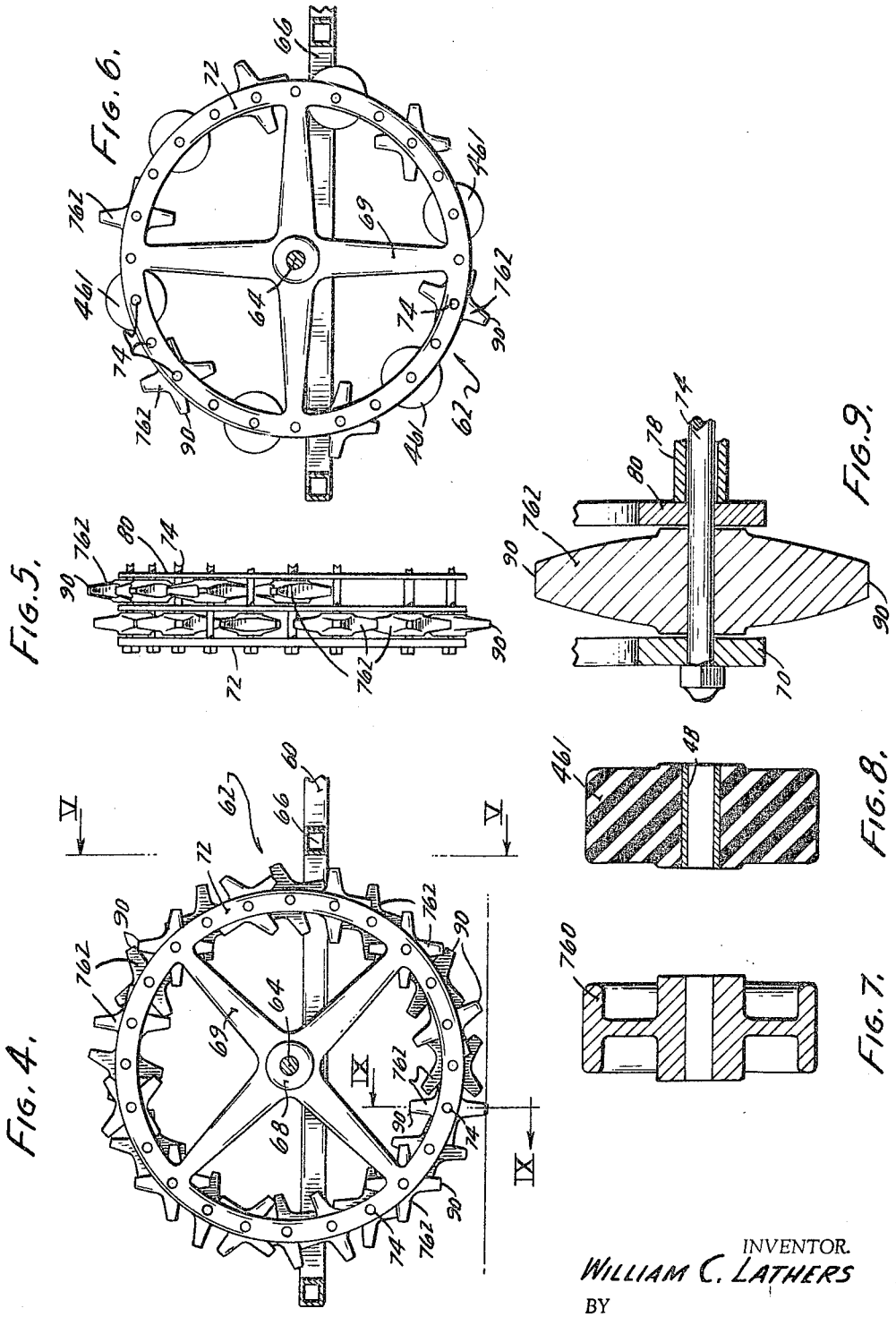

United States Patent Office 3,269,285
Patented August 30, 1966

3,269,285
EARTH COMPACTING DEVICE
William C. Lathers, 4337 Britta Parkway,
Madison, Wis.
Filed Feb. 12, 1964, Ser. No. 344,343
9 Claims. (Cl. 94—50)

This invention relates to an earth compacting device.

The invention has particular utility when it takes the form of a skeletonized bull wheel roller mounted on the rear axle of a vehicle and comprising a rotatable frame, the entire ground-engaging peripheral tread portion of the roller being made up of rolls of either cylindrical or sheepsfoot form, all of which are individually rotatable upon individual shafts forming a part of the skeletonized roller frame.

The invention may also take the form of a skeletonized trailing roller frame having shafts upon which compacting rolls are mounted, preferably in a staggered pattern.

In all forms of the invention, it is desirable that baffle means be disposed within the frame of the skeletonized frame of the roller for discharging axially from the end of the roller soil which is picked up by the individual rolls and falls into the interior.

As will be explained, the tread rolls may be cylindrical or tapered, they may be made of metal or such non-metallic materials as hard rubber, or they may be star-shaped to constitute miniature sheepsfoot rolls. In any case, they are desirably mounted for rotation with respect to the frame. It may at first be supposed that freely rotatable tread rolls mounted on the periphery of a skeletonized wheel frame would transmit no traction and have little, if any, compacting effect. However, just the contrary is true. Despite the fact that the tread rolls are individually rotatable, the rollers exert sufficient traction so that they will not only propel a heavy tractor but will pull a towed vehicle of substantial weight. If sufficient resistance is offered to prevent the vehicle from advancing, the bull wheel rollers will actually dig themselves into the soil notwithstanding the fact that the individual tread rolls are mounted for free rotation.

In the drawings:

FIG. 1 is a view in side elevation of a tractor and a towed compacting roller representing in one assembly specifically different embodiments of the compacting organization.

FIG. 2 is a view of the towed roller partially in rear elevation and partially in section on the line II—II of FIG. 1.

FIG. 3 is a view in rear elevation of one of two tractor bull wheels, the other being shown in axial section on the line III—III of FIG. 1.

FIG. 4 is a fragmentary detail view of a modification of the towed compacting roller shown in FIG. 1, the frame thereof being broken away.

FIG. 5 is a detail view on the line V—V of FIG. 4.

FIG. 6 is a view similar to FIG. 4 showing a further modified embodiment.

FIG. 7 is a deail view in cross section through one of the individual compacting rolls.

FIG. 8 is a view similar to FIG. 7 showing in section a modified individual compacting roll.

FIG. 9 is an enlarged detail view on the line IX—IX of FIG. 4.

The vehicle 10 is shown diagrammatically. It comprises a prime mover, here illustrated only as an engine hood at 12. This is supported by dirigible wheels 14 controlled by a steering wheel 16. The usual transmission housing 18 extends rearwardly from the power source. It forms the backbone or frame of the tractor and contains a drive shaft 20 connected by worm 22 and worm gear 24 with the rear axle 26. On the housing 18 is supported the operator's seat 28.

Skeletonized bull wheels 30 are mounted on the oppositely projecting ends of shaft 26. They comprise compacting rollers having skeletonized frames including inner and outer hubs 32, 34 from which spokes 36, 38 extend to the inner and outer rings 40 and 42 respectively. These are connected by shafts which may constitute bolts 44 which not only support the individual compacting tread rolls 46 but carry bushings 48 which space the intermediate rings 50 as clearly shown in FIG. 3. At each side of each of the intermediate rings 50 in an annular series of the roll 46. These tread rolls are freely rotatable upon the shafts or bolts 44 and they are preferably staggered angularly so that the rolls of one annular series are not directly aligned with the rolls at each side thereof. This is clearly shown at the left hand side of FIG. 3 and also in FIG. 1.

Within the skeletonized bull wheel roller 30 there is preferably a deflector of some sort for axially ejecting dirt falling into the interior of the roller from the tread rolls 46. In the construction shown in FIG. 3 the deflector 52 comprises a cone having its smaller end at the outside of the bull wheel and having its larger end supported on the offset portions 54 of the inner spokes 56 of the bull wheel.

A coupling 58 at the rear of the tractor frame is connected with the draw bar 60 of a towed skeletonized compacting roller 62. The shaft 64 for the towed roller 62 is mounted transversely on a generally rectangular frame 66. The shaft may either be fixed as shown, with the roller hubs 68 rotating thereon, or the shaft may rotate with the roller. It is preferred that the shaft be fixed in order that the deflector as hereinafter described may be positioned by the shaft instead of having to be weighted to maintain it in the desired position.

In general, the skeletonized roller 62 is similar to the skeletonized bull wheel roller above described except that it is at least twice, or more than twice, as wide. Its frame comprises spoke-supported end rings 70 and 72. The shafts 74 upon which the compacting tread rolls 76 are individually rotatable extend from one end ring to the other through spacing bushings 78 and intermediate rings 80. As in the bull wheel construction, each of the tread rolls 76 is freely rotatable on its shaft 74.

Baffles 82 are supported on the shaft 64. They are connected together centrally of the skeletonized structure as shown at 84 in FIG. 2 and each of the baffles 82 is generally trough shaped and arranged to discharge dirt toward its lower free end 86 for ejection from the skeletonized roller frame. As in the construction originally described, the annular series of rolls in any given plane between consecutive intermediate rings 80 will be angularly offset or staggered with reference to the rolls of the adjacent annular series.

FIG. 7 shows a detail in cross section of an appropriate roll usable at 46 in the bull wheel arrangement shown in FIG. 3 or at 76 in the trailer roller shown in FIG. 2. In the FIG. 7 construction, the roller 760 is generally cylindrical and is made of metal shaped by appropriate procedure. Preferably it is either cast or forged to save the expense of turning it on a lathe.

The alternative roll 461 shown in FIG. 8 is non-metallic. I have found that rubber of appropriate hardness is a satisfactory material for a roll of this sort and I have shown it mounted on one of the bushings 48.

The roll 762 shown in FIGS. 4, 5 and 9 is generally cruciform or star-shaped in end elevation. FIG. 9 illustrates that when a metallic roll is used it need not be provided with one of the bushings 48 or 78, although there is no objection to having a bushing. The individual ends 90 of the roll 762 are blunt and because of their limited area have very high compacting effect. The tread of either the bull wheel 30 or the towed roller 62 may be comprised entirely of cylindrical rolls or entirely of these sheepsfoot rolls as shown in FIG. 4 and FIG. 5. Alternatively, the sheepsfoot rolls and generally cylindrical tread rolls 46, 760 or 461 may alternate with rolls 762 as shown in FIG. 6. This is a preferred structure for compacting some types of soil, since the rolls 46 level the irregularities of soil displaced by the sheepsfoot rolls 762.

A tractor having bull wheels made as herein disclosed has been operated on loose gravel carrying a superimposed load of many times its own weight while at the same time pulling a trailing roller of the general organization of that shown in FIG. 1. Despite the fact that the earth contacting tread portions of the bull wheel rollers are comprised entirely of individually rotatable rolls, the bull wheels did not slip but advanced the load and the trailer, at the same time effectively compacting the traversed material. The free rotation of the peripherally mounted tread rolls makes these very effective and the earth picked up and discharged by the individually mounted tread rolls is ejected from the interior of the skeletonized compacting structure by means of the baffles provided. It will be understood that the illustrated baffle arrangements are merely exemplifications of the many possibilities.

A variety of compacting effects can be achieved according to the arrangement and materials and form of the individual rolls. The structure permits a ready interchangeability of rolls varying from elastically deformable rubber rolls to hard rubber rolls to steel rolls to sheepsfoot rolls or any combination of rolls. The desirable arrangement disclosed in FIG. 6 is merely one exemplification of numerous possibilities of combining rolls of different types.

I claim:

1. An earth compacting device comprising a generally cylindrical skeletonized roller frame having a mounting shaft, hub means rotatable about the axis of the shaft, spoke means radiating from said hub means, ring means carried by the spoke means, circumferentially spaced shafts carried by said ring means, rings mounted on the shafts and through which the shafts extend, spacers between said rings maintaining the rings in substantial parallelism, the space in the interior of the frame being free of any support for said rings to facilitate discharge of earth, and rotatable tread rolls mounted on the shafts in a plurality of annular series, the rolls of each series being interposed between spaced rings and mounted on respective shafts and freely rotatable in clearance assured by said spacing means and with the rolls of one annular series staggered in relation to the rolls of an adjacent annular series.

2. An earth compacting device according to claim 1 having a deflector mounted within said frame for discharging axially of said frame earth falling within the frame from said tread rolls.

3. An earth compacting device according to claim 2 in which said deflector comprises a generally conical baffle.

4. An earth compacting device according to claim 2 in which said deflector comprises a generally trough-shaped baffle disposed obliquely across the axis of said frame.

5. An earth compacting device according to claim 1 in which tread rolls rotatable on the respective shafts comprise at least some rolls of sheepsfoot construction having generally radially projecting arms with blunt ends.

6. An earth compacting device comprising a tractor having a prime mower and ground-traversing supports and having a drive shaft and means for operatively connecting the prime mover with the drive shaft for propelling the tractor, said shaft having as its propelling means a roller comprising a skeletonized generally cylindrical roller frame, said frame including hubs axially spaced on the shaft and provided with radiating spokes, ring means carried by the spokes and annular series of shafts parallel to said drive shaft, means for mounting the ends of the shaft on the ring means, axially spaced rings mounted on the shafts, means for spacing the rings from each other, and rolls rotatably mounted on the shafts in staggered annular series between said rings and constituting an earth contacting tread of said roller for driving said tractor as well as compacting soil traversed thereby.

7. An earth compacting vehicle comprising a drive shaft, means for rotating the drive shaft, bull wheel roller means mounted on the drive shaft and comprising a skeletonized frame having hub means axially spaced on the drive shaft for rotation therewith and provided with spokes, orbitally movable shafts carried by the spokes, axially spaced rings supported on the orbitally movable shafts, and tread means on said frame comprising rolls in annular series rotatably mounted on the orbitally movable shafts between said rings, the bull wheel roller means rotating the rolls of said tread means circumferentially with said shaft for propelling the vehicle as well as compacting earth traversed thereby.

8. An earth compacting vehicle according to claim 7, in which the individual rolls are of different types for cooperative effect upon the soil traversed by said roller.

9. An earth compacting device according to claim 8 in which at least some of said individual rolls constitute sheepsfoot rolls having generally radially extending arms with blunt ends.

References Cited by the Examiner

UNITED STATES PATENTS

| | | | |
|---|---|---|---|
| 1,955,224 | 4/1934 | Brown | 94—50 |
| 2,911,893 | 11/1959 | Achibald | 94—50 |
| 2,938,439 | 5/1960 | Robison | 94—50 |
| 3,080,799 | 3/1963 | Calfee | 94—50 |

OTHER REFERENCES

Fauner: German printed application No. 12,952, April 1956.

JACOB L. NACKENOFF, *Primary Examiner.*

CHARLES E. O'CONNELL, *Examiner.*